United States Patent [19]
Coyle

[11] 3,800,462
[45] Apr. 2, 1974

[54] LIVE-WELL AERATOR

[76] Inventor: Charles Ray Coyle, 3412 Stoneycrest, Bloomington, Ind. 47401

[22] Filed: Aug. 3, 1973

[21] Appl. No.: 385,226

[52] U.S. Cl. .............................. 43/57, 261/121 M
[51] Int. Cl. ............................................. A01k 97/04
[58] Field of Search .............. 43/57, 55; 261/121 M

[56] References Cited
UNITED STATES PATENTS

| | | | |
|---|---|---|---|
| 2,151,225 | 3/1939 | Newton | 43/55 |
| 2,639,906 | 5/1953 | Butler | 43/57 X |
| 2,923,087 | 2/1960 | Cummings | 43/55 |
| 2,936,542 | 5/1960 | Butler et al. | 43/57 |
| 3,078,612 | 2/1963 | Wait | 43/55 |
| 3,315,403 | 4/1967 | Smith | 43/55 |
| 3,357,127 | 12/1967 | Barradale | 43/55 |

Primary Examiner—Antonio F. Guida
Assistant Examiner—Daniel J. Leach
Attorney, Agent, or Firm—Woodard, Weikart, Emhardt & Naughton

[57] ABSTRACT

A submersible, battery operated, bilge pump located within a live-well in a boat serves to pump live well water through a hose to a section of rigid tubing having small holes along its length above the water surface to spray water back into the well at a 45° angle, for aeration and cooling. A length of plastic tubing from the rigid tube enables overboard discharge of a portion of pumped water as determined by a valve setting, to keep fresh water coming into the well through an underwater entrance port.

16 Claims, 5 Drawing Figures

PATENTED APR 2 1974  3,800,462

LIVE-WELL AERATOR

BACKGROUND OF THE INVENTION

1. Field of the Invention

This invention relates to aeration and circulation of water in a live-well used to hold either fish or live fish bait, and more particularly a device that will aerate and circulate at the same time while maintaining a constant water level within the live-well.

2. Description of the Prior art

Live wells have been used for keeping fish and fish bait alive. Patents known to me relating to this subject are U.S. Pats. Nos. as follows:

| | | |
|---|---|---|
| 2,936,542 | Butler et al. | May 17, 1960 |
| 2,951,309 | Briscoe | Sept. 6, 1960 |
| 3,078,612 | Wait | Feb. 26, 1963 |
| 3,315,403 | Smith | Apr. 25, 1967 |
| 3,509,657 | Bross, Jr. | May 5, 1970 |

In the typical prior art live-well, a hole through the bottom of the boat will permit water to enter the well until the level of the water in the well corresponds to the level of the body of water supporting the boat. The oxygen content of surface water, especially during summer months, is often below that required to maintain life of either fish or bait. Even when the dissolved oxygen content of the water is sufficient to sustain life at the time it enters the live well, the fish will soon consume the oxygen and then expire. It is possible to circulate water through the live well by means of a pumping action or a scoop and indeed both methods are known to the art and are being used. It is also possible to aerate water within the well, but without circulating the water and replacing it with fresh water, it soon becomes stagnant and will not sustain life by further aeration.

Some problems that remained unsolved prior to this invention, were to circulate the surface water through the well to prevent stagnation while adding enough oxygen to sustain life and yet maintain a constant water level within the live well.

It is, therefore, the object of this invention to provide a fresh water circulating device that will aerate the water while circulating and maintain a constant water level within the live well.

It is further the object of this invention to provide life sustaining aeration and circulation which is not dependent on the motion of the boat for its effectiveness.

It is further the object of this invention to provide aeration in the live well when the boat has been removed from the lake and being trailered to a place of storage.

Another object of this invention is to provide such an aerating device that is compact and may be mounted in a portable box or camp type cooler if the boat is not equipped with a live-well.

Another object of this invention is to provide such a device that is reliable, economical, simple, and of durable construction.

SUMMARY OF THE INVENTION

Described briefly, in a typical embodiment of the present invention, a container disposed in a body of water, typically by being secured to and thereby a part of a boat, or disposed exterior to the boat and supported thereon, has water entrance means therein below the level of the surface of the body of the water, whereby the container has water therein. A pump is submerged in the water in the container and has a spray tube coupled to its outlet, at least one spray outlet being disposed above the surface of the water in the container and directing a spray downward onto the surface, the spray water being supplied by the pump. A water waste tube is also coupled to the pump outlet, and valve means are coupled between the pump outlet and the waste tube to control the amount of water discharged overboard, from zero to a certain maximum amount, to cause either a small amount of water to be induced through the water inlet into the container, or a large amount, respectively. Thus the pump circulates fresh water through the container and also aerates the water in the container.

DESCRIPTION OF THE PREFERRED EMBODIMENT

Figure 1:
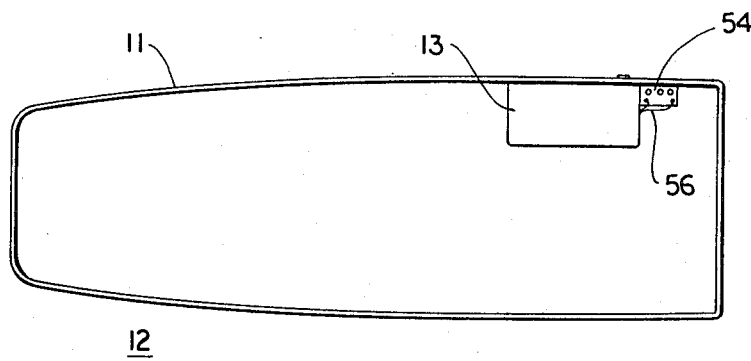
FIG. 1 is a top plan view on a small scale showing a boat floating in a body of water and having a live-well therein incorporating a typical embodiment of the present invention.
Figure 2:
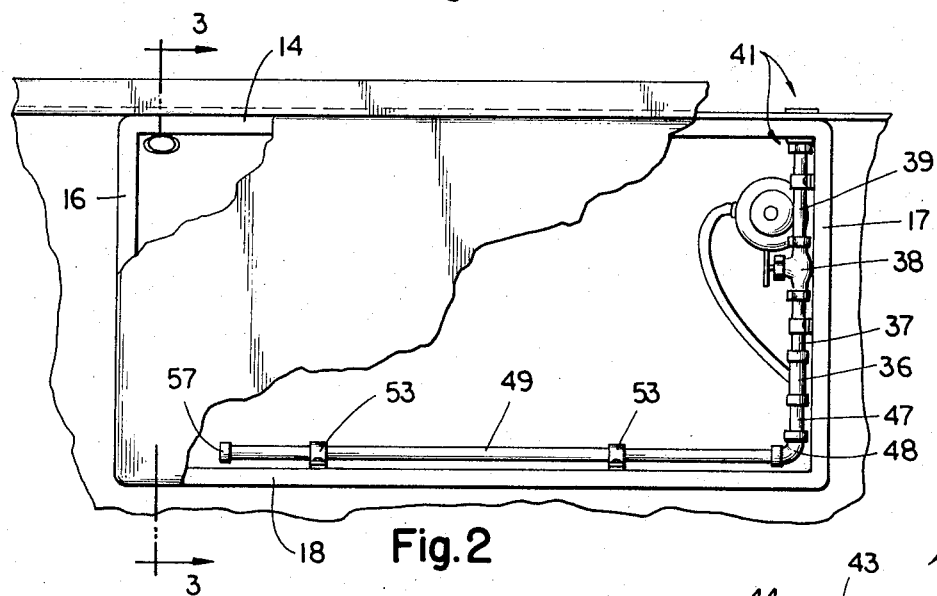
FIG. 2 is an enlarged fragmentary portion of FIG. 1 showing interior details of the aeration and circulation equipment, a portion of the lid of the live-well being broken away to illustrate those details.
Figure 3:
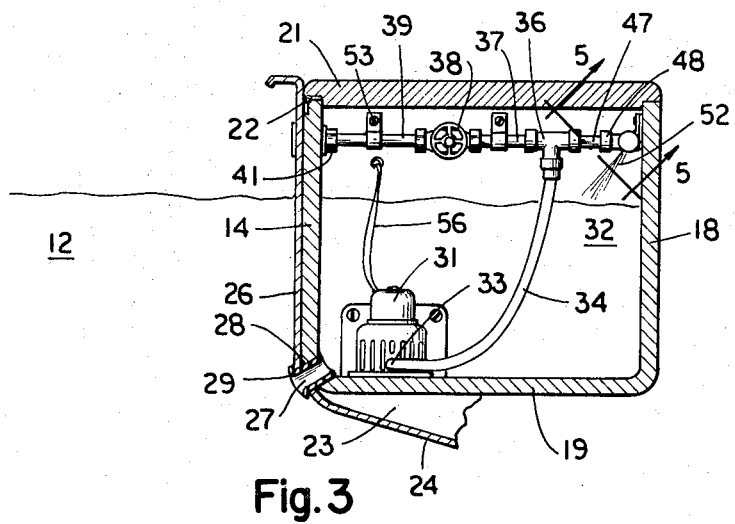
FIG. 3 is a section taken at line 3—3 in FIG. 2 and viewed in the direction of the arrows.

Referring to the drawings, FIG. 1 shows the boat 11 floating in a body of water 12, the boat having a live-well 13 therein. As best shown in FIG. 3, this particular form of live-well is virtually a complete container having walls 14, 16, 17, 18, a bottom 19, and lid 21 hinged to the wall 14 at hinge 22. This container may rest on a gusset 23 disposed in and secured to the bottom 24 of the boat, and the container can be strapped to the side wall 26 of the hull or secured thereto by some other means so that a water entrance hole 27 in the container communicates with a registering inlet hole 28 in the hull to admit water to the live well, but accommodate sealing by a suitable grommet 29, if desired, to avoid leakage of water into the boat itself.

The material of the walls of the container is made of a water impermeable material so that the container can be lifted out of the boat, if desired, for shipment of the container separate and apart from the boat, if desired. In that event, and if the container continues to contain water, the aperture 27 can be plugged. Also, if the boat is removed from the water for transportation on a trailer or the like, the entrance 27 can be plugged, and there will be no leakage of water from the container.

Figure 4:
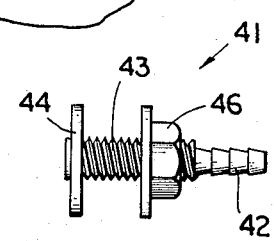
FIG. 4 is a further enlarged elevational view of the waste outlet fitting employed in the illustrated embodiment.

The typical embodiment of the aeration apparatus itself includes a bilge or sump pump 31 submerged in the water 32 in the container and having a water inlet and having a water outlet 33 connected typically by a flexible hose 34 to a flow divider 36. A short length of rigid tubing 37 is connected to one side of the splitter or flow divider 36, and a manually controllable valve 38 is connected to the tube 37. A flexible tube 39 is connected to a valve 38 and to the through-hull connector assembly 41. This assembly is better shown in FIG. 4 where the tubing adapter portion 42 is affixed to the inner end of the externally threaded nipple or fitting 43 having the flange 44 threaded onto or welded to the outer end, and a flanged nut or nut and washer assembly 46 threaded thereon inside the hull. As shown in FIG. 3, this assembly is extended through the wall 14 of the container and the wall 26 of the hull and provides a waste discharge outside the boat above the surface of the body of water 12.

Figure 5:
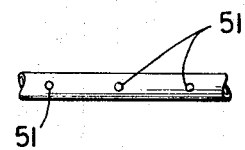
FIG. 5 is a fragmentary view of the spray tube, the view being taken at line 5—5 in FIG. 3 and viewed in the direction of the arrows.

The other end of the flow divider 36 is connected to a short length 47 of rigid tubing having an elbow 48 connected to the outer end thereof, and to which a length of perforated tubing 49 is secured. As indicated in FIG. 5, this tubing 49 has a plurality of apertures 51 horizontally spaced along it and, as best indicated in FIG. 3, these discharge a spray of water as at 52 downwardly at a 45° angle with respect to horizontal toward and into the surface of the water 32 contained in the live-well.

The whole aeration assembly is mounted in the container by means of clamps or clips as at 53. Electrical energy is applied to the pump from the battery 54 (FIG. 1) through the conductors 56. The end 57 of the spray tube 49 is normally capped.

In operation, the operator can control the amount of water being circulated through the live-well, and the amount being used for aeration, by adjusting the setting of the valve. As water is pumped from the well back to the body of water in which the boat is floating, the wasted water is replaced by water entering through the inlet aperture 27 below the water line of the boat. Therefore, a constant water level is maintained in the live-well.

If the fisherman wishes to put his boat on a trailer with fish in the live-well, the inlet hole is plugged, to maintain the water in the well when the boat is removed from the water. The control valve is then adjusted to prevent any water wasting overboard through the fitting 41, by simply closing the valve. Then, all of the water supplied by the pump is directed through the spray tube for aeration.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. A live-well circulator and aerator comprising:
a pump having a water inlet and a water outlet;
first conduit means connected to said outlet and to a flow divider;
second conduit means connected to said flow divider and having a plurality of discharge ports spaced therealong for discharging water therefrom, said second conduit means being a rigid tube and rigidly connected to said flow divider;
third conduit means directed to waste outlet means, said third conduit means including a first portion rigidly connected to said flow divider and having first valve means therein, and said third conduit means including a second portion having the waste outlet means at the downstream end thereof to discharge waste water,
said second conduit means being disposed at an elevation above said pump.

2. The combination of claim 1 wherein:
said first valve means is manually adjustable to control flow in said third conduit means, and is operable to completely terminate flow therein when desired.

3. The combination of claim 1 and further comprising:
a chamber containing water therein, said pump being submerged in the water and said second conduit discharge outlets being disposed above the surface of the water and directed toward the surface of the water, and the waste outlet means opening outside the chamber.

4. The combination of claim 3 and further comprising:
a boat;
said chamber being disposed inside said boat and having a water inlet below the water line of the boat.

5. The combination of claim 4 and further comprising:
a source of energy coupled to said pump for operation thereof.

6. The combination of claim 1 wherein:
said second portion of said third conduit means includes a flexible tube having said waste outlet means at the downstream end thereof movable to dispose said waste outlet means at a level above said pump.

7. The combination of claim 6 and further comprising:
a water container having water contained therein;
clamp means attached to said container and holding said rigid tube securely spaced above the surface of the water in said container;
said flexible tube being sufficiently long and flexible to enable disposition of the outlet means over the upper edge and thereby to the exterior of the container, and alternatively inside the container.

8. The combination of claim 7 wherein:
said container has a pluggable water passage port below the water level therein.

9. A live well aeration and circulation system comprising:
a container floating in a body of water and having water entrance means therein below the level of the surface of the body of water, said container having water therein;
a pump having water inlet means and water outlet means;
a water spray tube coupled to the pump outlet means and having at least one spray outlet above the surface of water in the container;
a water waste tube coupled to the pump outlet means;
and valve means coupled between said pump outlet means and said waste tube;
said pump inlet means being submerged in the water in the container and said pump thereby drawing water from the container and forcing it to said spray tube and to said valve means, for spraying water through the air above the container water surface back into the container,
said valve means being operable to divert a portion of the water from the pump to the waste tube, the portion being variable from zero to a maximum, as desired, to induce flow of water from the body through said water entrance means into the container to replace in the container the water discharged through said waste tube.

10. The system of claim 9 wherein:
said waste tube discharges water into the body.

11. The system of claim 9 wherein:
walls and the bottom of said container are water impermeable, and the configuration and area of said entrance means are susceptible to intentional plugging to continue to contain water in the container upon removal of said container from the body of water.

12. The system of claim 11 wherein:
the outlet end of said waste discharge tube is above the desired level of the water surface in the container.

13. The system of claim 11 wherein:
said waste discharge tube projects through a side wall of the container.

14. The system of claim 9 wherein:
said spray outlet is pointed downward toward the container water surface.

15. The system of claim 14 wherein:
said spray outlet is pointed downwardly at an angle 45 degrees below horizontal.

16. The system of claim 14 wherein:
spray tube is rigid and has a plurality of spray outlets spaced therealong, spraying water generally downward toward the container water surface, for return to the container in aerated condition.

* * * * *